S. S. Walley.
Coffer Dam.
Nº 4,759. Patented Sept. 15, 1846.
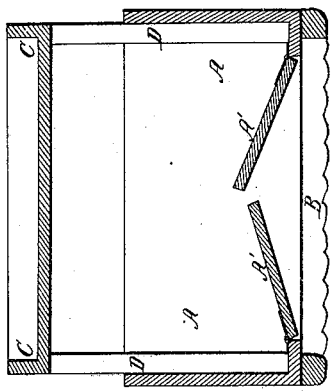
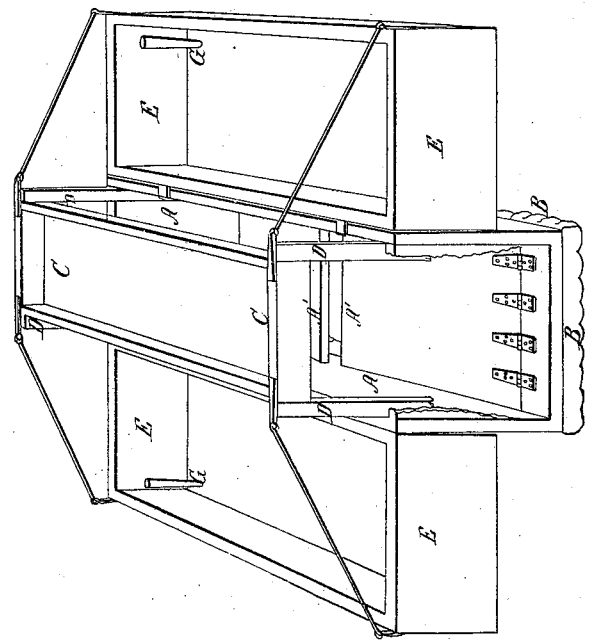

UNITED STATES PATENT OFFICE.

SAMUEL S. WALLEY, OF CHARLESTOWN, PENNSYLVANIA.

COFFER-DAM.

Specification of Letters Patent No. 4,759, dated September 15, 1846.

*To all whom it may concern:*

Be it known that I, SAMUEL S. WALLEY, of Charlestown township, in the county of Chester and State of Pennsylvania, have invented a new and useful manner of constructing coffer dams to be used for the sinking of foundations for piers, for the driving of piles, the removal of obstructions, or for other purposes where work is to be performed on the bottoms of streams or other waters of moderate depth, which apparatus I denominate the "portable coffer-dam"; and I do hereby declare that the following is a full and exact description thereof.

I prepare a box of such length, width and height, as may be necessary to constitute the required coffer dam, framing the timber work thereof in such manner as may be necessary to enable it to sustain the pressure of water to which it is to be subjected. This box, or coffer, is to be open at top, but at its lower side, where it is to rest on the bottom of the water, it is furnished with doors that open upward, and that. when down, convert the coffer into a floating vessel, said bottoms being made to fit closely, and to be confined down by bolts or other suitable fastenings. Above the top of the coffer I place a box capable of holding stones or other heavy bodies for the purpose of aiding in sinking the coffer; this box may be sustained on posts rising from the four corners of the coffer at a height sufficient to be out of the way in removing the matter that is to be thrown out. On each side of the coffer also, I suspend boxes for receiving stones, or other substances and into which water may also be admitted to aid in weighting the structure down.

On the lower edge of the coffer, that is to rest on the bottom of the water, a padding of wool, cotton, or other elastic material is to be placed, to cause the coffer to fit tightly to the bottom, so as to keep out water. Where the bottom is uneven it may be regulated by dredging, and the lower edge of the coffer may thus be adapted to all excepting rocky bottoms.

In the accompanying drawings Figure 1 is a perspective view of the whole structure, and Fig. 2 is a longitudinal vertical section of it in the line *x x* of Fig. 1.

A A is the coffer, which, in Fig. 1, is shown as having the fore end cut away to show the interior.

A' A' are the doors, which constitute its bottom.

B B represents the padding along the bottom edge of the coffer.

C C is a box which is sustained above the coffer on the posts D D; this may be filled with stones to aid in sinking the coffer.

E E are two troughs or boxes which are attached to the upper edge of the coffer and are braced thereto; these also may be filled with stones and water may also be let into them by removing the plugs at G G.

When this apparatus is to be used it is prepared by closing the doors of the coffer and pumping the water therefrom, which will render the whole buoyant; the quantity of stones in the respective boxes should be sufficient to sink the coffer as deeply as is compatible with its being transported by towing to the spot where it is to be used; when there the doors at bottom are to be opened; it will then settle down and become converted into a coffer dam. To increase its pressure on the bottom the plugs G G may be removed, and water allowed to flow into the boxes, or troughs E E. When the apparatus is to be removed, the doors A' A' are to be closed, the water pumped out of the coffer, and, if necessary, out of the boxes E E.

Having thus fully described the manner in which I construct and employ my portable coffer dam, what I claim therein as new and desire to secure by Letters Patent, is—

The manner in which I have arranged and combined the respective parts thereof so as to adapt it to the purposes intended, as herein made known; that is to say, I claim in combination the providing of the inner box or coffer, with doors at its lower part, which when closed will convert it into a buoyant vessel; said coffer being provided with elastic padding on its lower edge, and troughs, or boxes capable of receiving such load of stones, or other materials, as will sink, and press the coffer down upon the bottom of the stream or other water, as herein fully made known, and the expedient of letting in the water to fill the side boxes to increase the pressure, and the pumping out of said water to render it more buoyant.

SAM. S. WALLEY.

Witnesses:
THOS. P. JONES,
EDWIN L. BRUNDAGE.